2,902,437
Patented Sept. 1, 1959

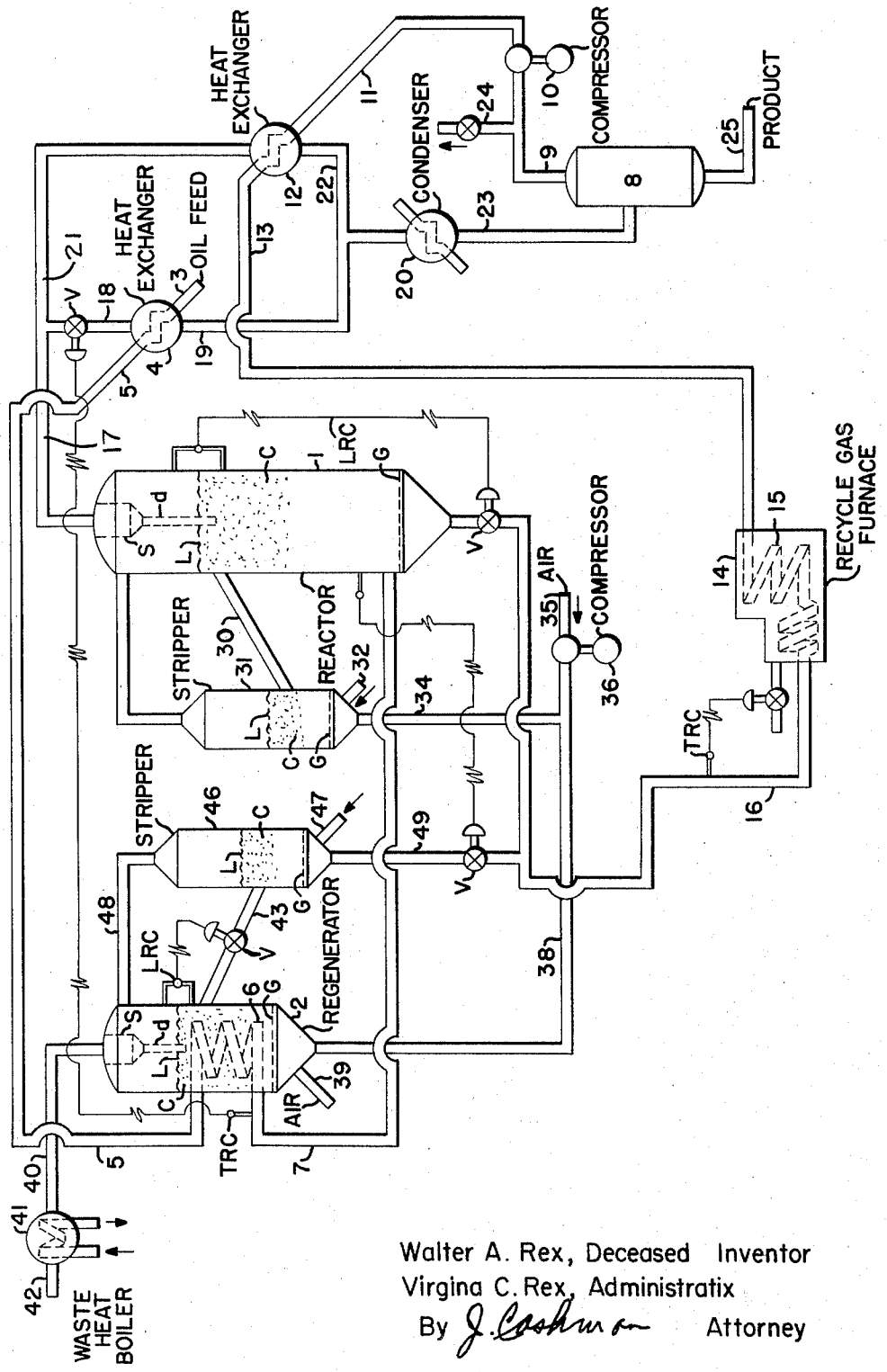
Walter A. Rex, Deceased Inventor
Virgina C. Rex, Administratix
By J. Cashman  Attorney

United States Patent Office

2,902,437

HYDROFORMING WITH SPECIAL HEAT INTERCHANGE

Walter A. Rex, deceased, late of Westfield, N.J., by Virginia C. Rex, administratrix, Westfield, N.J., assignor to Esso Research and Engineering Company, a corporation of Delaware Application August 26, 1955, Serial No. 530,873

3 Claims. (Cl. 208—159)

The present invention relates to improvements in the hydroforming of naphthas. More particularly, the present invention relates to an improved method for supplying heat to the highly endothermic hydroforming reaction which is carried out in the presence of a fluidized bed of hydroforming catalysts.

It is, of course, well known that hydroforming is an operation in which a virgin naphtha, cracked naphtha or a mixture of the two are contacted at elevated temperatures and pressures with a solid catalytic material in the presence of added hydrogen. The purpose of the hydroforming process is to increase the anti-detonation quality of the naphtha. The chemical reactions involved are principally dehydrogenation of naththenes, aromatization of paraffins, isomerization of naphthenes and paraffins and some hydrocracking. The process is usually conducted so that there is no net consumption of hydrogen and generally there is a net production of hydrogen.

Many catalysts have been proposed for use in hydroforming. The catalysts most extensively investigated are molybdenum oxide, chromium oxide and the platinum group metals. These hydrogenation-dehydrogenation materials are usually supported on an adsorbent material such as active alumina. A preferred form of alumina is the eta form.

In brief compass, the present invention provides means whereby a hydroforming plant is so designed as to permit elimination of the usual naphtha preheating furnaces, and the heat necessary to support the hydroforming reaction in the hydroforming zone is supplied in part by the heat released in a regeneration zone where the catalyst is treated with an oxygen-containing gas to convert to removable volatile material, carbonaceous and other deposits formed on the catalyst during the hydroforming reaction. In a word, heat is supplied to the hydroforming zone, according to the present invention, by forcing the feed naphtha through a coil or other conduit means which means are disposed in a bed of fluidized catalyst undergoing regeneration in a regeneration zone. The hot products issuing from the hydroforming zone are divided into two parts and are heat-exchanged with naphtha feed and hydrogen-containing gas in separate heat-exchangers, the stream of hot product being split by automatic means to permit variation in feed naphtha preheat temperatures and recycle gas preheat temperatures.

An object of the present invention is to provide improved means for supplying heat to a hydroforming reaction.

As a corollary to the preceding object, another object of the present invention is to simplify and reduce the cost of a hydroforming plant using a catalyst according to the fluidized solids technique which permits elimination of the usual naphtha preheating furnaces.

Other and further objects of the present invention will appear in the following more detailed description and claims.

In the accompanying drawing there is set forth an apparatus layout in which a preferred modification of the present invention may be carried out into effect.

Similar reference characters refer to similar parts and beds.

Referring in detail to the drawing, 1 represents a reactor and 2 represents a regenerator. These cases or vessels may be cylindrical in shape with conical bases and brown pieces. Both are provided with gas distributing means G which may be a screen or a grid or other devices which serve to distribute uniformly, the vaporiform or gaseous material which passes upwardly therethrough into a fluidized bed of powdered hydroforming catalyst C. The beds of catalyst in the reactor 1 and the regenerator 2, respectively, are maintained in the fluidized state by causing the vaporiform and gaseous material to flow upwardly at a superficial velocity of from about 0.5 to 2.5 feet per second. The particle size of the catalyst for good fluidity may be as follows:

| | Weight percent |
|---|---|
| 0–20 microns | 0–5 |
| 20–40 microns | 25–20 |
| 40–80 microns | 65–70 |
| 80–200 microns | Balance |

In operation the naphtha feed enters the present system through line 3 and passes in heat exchange relationship in heat exchanger 4 with a portion of the hot product recovered overhead from reactor 1, wherein the naphtha is preheated to a temperature of about 700° F. The preheated naphtha then is withdrawn from heat exchanger 4 through line 5 and passed into a coil 6 disposed as shown immersed in the bed C of catalyst undergoing regeneration in regenerator 2. As will appear more fully hereinafter, the degree of immersion of coil 6 in the fluidized bed of catalyst C in regenerator 2 may be varied according to the temperature of the oil in said coil. In other words, in this preheating of the naphtha, thermal cracking temperatures, say, temperatures of 900°–950° F. should not be exceeded. The preheated naphtha is withdrawn from coil 6 through line 7 and passed into the bottom of reactor 1 where it passes upwardly into the bed of catalyst C. Hydrogen is added to the reactor 1 in a manner presently to be explained. This hydrogen is obtained from the product, which product is delivered to a separation drum 8, the hydrogen being withdrawn overhead from said drum, through line 9, passed through a compressor 10, thence passed via line 11 to a heat exchanger 12, wherein it passes in heat exchange relationship with a second portion of the hot products from reactor 1. In this heat exchanger, the recycle gas is heated to a temperature of 600°–700° F. and then withdrawn from the heat exchanger, through line 13 and passed into a furnace or other suitable heating means 14 wherein the "recycle" gas is heated to a temperature of about 1100°–1400° F. in coil 15 in furnace 14. The thus heated "recycle" gas or hydrogen-containing gas is withdrawn from coil 15 through line 16 and charged to the bottom of reactor 1. As will appear more fully hereinafter, regenerated catalyst is picked up in the recycle gas stream from aerated standpipe 49 and carried into reactor 1. It will be noted that the hydrogen in line 16 and the naphtha in line 7 are not admixed prior to entry into reactor 1.

Under conditions more fully explained hereinafter, the desired hydroforming reaction occurs in reactor 1 and the product passes from the bed of catalyst C into a disengaging space between L, the upper dense phase level of bed C and the top of the reactor where the major portion of the catalyst is separated from the gasiform and vapor material and returned to the bed of catalyst C.

Before the product is withdrawn from the reactor, it is passed through one or more gas-solids separating devices S wherein the last traces of entrained catalyst are substantially completely removed from the vapors and gases and returned to the bed of catalyst C through one or more dip pipes *d*. The product is withdrawn overhead from reactor 1 through line 17 and a portion of this hot product is passed via line 18 through heat exchanger 4 where it, as previously indicated, adds heat to the naphtha feed which is passed through said heat exchanger 4. The partially cooled product passes from heat exchanger 4 via line 19 and into a cooler 20 wherein it is cooled sufficiently to condense normally liquid constituents. Another portion of the product in line 17 passes via 21 into heat exchanger 12 where it passes in heat exchange with "recycle" gas fed to said heat exchanger 12 via line 11, as previously indicated. The partially cooled product is withdrawn from heat exchanger 12 via line 22 and passes into condenser 20. The recombined cooled product is withdrawn from condenser 20 through line 23 and charged into the separation drum 8. A portion of the gas obtained from drum 8, over and above that necessary, for use in reactor 1 is withdrawn from the system via line 24. This gas in line 24 may be utilized in processes requiring hydrogen since it has a purity of from 65–76 volume percent where the catalyst is, say, molybdenum oxide on alumina and where the catalyst is a platinum group metal carried on alumina, the hydrogen concentration in this gas may be as high as 90%. In either case, this hydrogen-containing gas is useful as a hydrogenating material for saturating di-olefins, in hydrodesulfurization of oils and for other uses.

A liquid product is withdrawn from drum 8, through line 25 and delivered to finishing stills and other equipment to recover the desired product.

During use in the hydroforming zone 1, the catalyst becomes contaminated with carbonaceous and other deposits and requires, therefore, regeneration to maintain it at a high level of activity. Toward this end, the fouled catalyst is withdrawn from reactor 1 through line 30 and charged to a stripper 31 wherein it is treated with a stripping gas, such as nitrogen, steam or the like, which stripping gas is charged to the stripper 31 via line 32. The catalyst in stripper 31 is formed into a dense fluidized bed extending from G to an upper dense phase level L. The stripping gas serves to dislodge volatile material from the catalyst, and the stripping gas and volatile material are withdrawn overhead from stripper 31 through line 33 and charged to the reactor at a point above the upper dense phase level L in said reactor. The stripped catalyst is withdrawn from stripper 31 through aerated standpipe 34 and charged into line 35 containing a stream of air or other oxygen-containing gas introduced into the system through line 35. The stripped catalyst in line 35 is formed into a suspension and carried into regenerator 2 via line 38. In regenerator 2 the catalyst is formed into a dense fluidized bed by controlling the linear velocity of the oxygen-containing gas within the limits of from ½ to 3 feet per second. It is preferred to supply via line 36 merely that quantity of the air required to serve as a carrier for the catalyst but insufficient to completely regenerate the catalyst, in order that excessive temperatures will not prevail in transfer line 38. Therefore, secondary air may be added to regenerator 2 via line 39 to complete the regeneration of the catalyst.

Under conditions more fully set forth hereinafter, the catalyst is regenerated and the regeneration fumes pass from the dense bed of catalyst C through the disengaging space disposed between L and the top of the reactor wherein the main bulk of the catalyst is separated from the regeneration fumes. As is customary, one or more gas-solids separating devices S are disposed in the upper portion of regenerator 2 and the fumes about to pass from the regenerator are forced through gas-solids separating devices S wherein the last traces of catalyst are removed from the fumes and returned to the bed of catalyst via one or more dip pipes *d*. The regeneration fumes are withdrawn from the regenerator through line 40 and their sensible and chemical heat may be recovered at least in part by forcing it through a waste heat boiler 41 before they are rejected from the system through line 42. The steam formed in waste heat boiler 41 may, of course, be used in the present plant, for example, in stripper 31 or stripper 46, or it may be used for other purposes in the refinery. The regenerated catalyst is withdrawn from the regenerator 2 via line 43 and charged to stripper 46 where it is formed into a dense fluidized bed and treated with a stripping gas charged to the stripper via line 47, the stripping gas serving to dislodge from the catalyst products of combustion. It is desirable to strip not only water from the catalyst but also carbon dioxide and carbon monoxide, for catalysts containing these oxides, particularly, the carbon monoxide may serve as a poison for the reaction in reactor 1. The stripping gas, therefore, is preferably an inert material such as nitrogen, although air may be used. The stripping gas and the dislodged materials are withdrawn from the bed of catalyst C and passed into a disengaging space disposed between L and the top of the stripper 46, and in this space the main bulk of the catalyst is separated from the gasiform material. The gasiform material passes from the stripper 46 via line 48 and is charged to a point near the top of regenerator 2. The regenerated catalyst is withdrawn from stripper 46 through aerated standpipe 49 and charged to the line 16 for return to reactor 1 as previously explained.

An important feature of the present process is the utilization of automatic controls. For example, the rate of circulation of hot stripped catalyst from stripper 46 to reactor 1 is automatically controlled by the operation of the device marked TRC which manipulates valve V in line 49 responsive to the temperature prevailing in reactor 1, the rate of hot catalyst circulation to reactor 1 being increased as the temperature tends to decrease in the fluid bed C of reactor 1 and vice versa.

The device TRC automatically controls the manipulation of valve V in line 18 responsive to the temperature prevailing in the discharge end of coil 6 by controlling the relative amounts of hot products in line 17 which are forced through heat exchangers 4 and 12, respectively. In other words, if the temperature in the discharge end of coil 6 becomes too high, say, above 965° F., then valve V in line 18 is partially closed, thus causing more of the hot product to flow through line 21 and through heat exchangers 12 so that colder oil passes into the coil 6 through line 5. On the other hand, if the outlet temperature of coil 6 is below a desired value, valve V in line 18 is opened to a greater degree to add heat to the fresh feed.

While the device TRC in line 18 is manipulated responsive to the temperature in the discharge end of coil 6, additional control of the temperature at the discharge end of coil 6 is obtained by regulating the level L of the bed in regenerator 2. To this end LRC is installed on regenerator 2 so that it actuates valve V in line 43 which controls the rate of flow of catalyst from regenerator 2. The range of temperature control by manipulating valve V in line 18 is limited by the design heat load of exchangers 4 and 12 and recycle gas furnace 14. In order to cause valve V in line 18 to operate within the desired limits, the necessary immersion of coil 6 in regenerator 2 is established by setting by hand the LRC to a given level in regenerator 2. In other words, the level L in regenerator 2 is varied in such a manner that the coil 6 may be completely immersed in the fluidized bed of catalyst therein or the upper turns of the coil may be above the dense phase level L, in other words, disposed in the dilute catalyst phase in the case where less heat addition were desired to the feed oil in coil 6. On the other hand, the coil 6 may be completely immersed in the bed of catalyst C in those situations where it is desired to add additional heat, With respect to TRC$_2$ which controls the rate to which fuel and air are fed to furnace 14, it is pointed out that this device is operative responsive to the temperature desired in recycle gas stream flowing in line 16.

The device LRC automatically controls the upper dense phase level L in reactor 1 responsive to the desired contact time of reactants and catalysts by manipulation of valve V in line 16.

With respect to the devices actuating the automatic controls mentioned above, it is pointed out that these control and/or metering devices do not, per se, form any part of the present invention, for they may be purchased from the manufacturer and installed in the present system.

In operating the process according to this invention, a rough setting of heat removal from the regenerator 2 is first made by adjusting the bed level in the regenerator to give the desired regenerator temperature and the coil 6 outlet temperature, that of the preheated feed naphtha. Since it is desired to control temperature T quite closely to avoid thermal cracking of the feed before it enters the reactor, this temperature can be controlled closely by the temperature controller changing the split of flow of the reactor product to the exchangers. This control has the effect of changing the temperature of the feed entering the regenerator coil and, thus, also regulates the amount of heat removal from the regenerator. It can be seen that the regenerator temperature and preheated naphtha temperature can both be effectively controlled in this manner with TRC operating valve in line 18 and LRC operating valve in line 43.

In order to explain the invention more fully, the following information is set forth:

*Conditions in reactor 1*

| | Range | Preferred |
|---|---|---|
| Catalyst, wt. percent MoO$_3$ on activated Al$_2$O$_3$ | 3–12 | 7–10 |
| Temperature, °F | 850–1,000 | 890–950 |
| Pressure, p.s.i.g | 50–500 | 175–250 |
| Oil feed rate, W./Hr./W | 0.1–1.0 | 0.2–0.5 |
| Recycle gas feed rate, s.c.f. per barrel of oil feed | 2,000–12,000 | 3,000–6,000 |
| Concentration of hydrogen in recycle gas, mol percent | 40–70 | 50–60 |
| Catalyst to oil ratio lbs. of catalyst per lb. of oil fed to reactor | 0.2–5.0 | 0.7–2.0 |

*Conditions in regenerator*

| | Range | Preferred |
|---|---|---|
| Temperature, °F | 900–1,200 | 1,050–1,150 |
| Pressure, p.s.i.g | 50–500 | 175–250 |
| Residence time of catalyst in regenerator, min. | 3–60 | 5–15 |

In order to show the advantages of the invention, the following is set forth:

Previous to this invention the naphtha to this reforming process was heated in a separate furnace and the excess heat in the regenerator was removed by means of boiler tubes immersed in the regenerator bed. Careful engineering studies were made of the costs of the new and old designs in which it was found that a savings in investment cost of the entire unit in the order of 15 percent resulted from the improvement of this invention.

The advantages of this method of process control are as follows:

(1) An expensive naphtha preheat furnace can be economically eliminated.

(2) The heat transfer rates to the naphtha coils in the regenerator bed are quite high and require less surface than would be used in a conventional furnace. This results in a saving in investment.

(3) Since the naphtha is preheated in the regenerator coil which is located adjacent to the reactor, a long transfer line, which would otherwise be required if a furnace were used, can be eliminated. This reduces thermal cracking of the feed before it enters the reactor because a much shorter transfer line can now be used.

(4) The control method outlined is an economical and effective way of controlling the process.

Numerous modifications of the invention will be apparent to those who are familiar with the present art.

What is claimed is:

1. In the method of catalytically hydroforming naphtha in a system comprising a reaction zone and a regeneration zone in communication therewith wherein the catalyst is in the form of a fluidized bed in each of said zones, and wherein the recycle gas is heated by means of extraneous heat, the improvement resulting in adding a substantial quantity of the heat required in the reaction zone which comprises subjecting the cold naphtha to indirect heat exchange with the hot hydroformed product, then passing the naphtha into indirect heat exchange relationship with the catalyst undergoing regeneration by passage through a coil arranged in the bed of catalyst in the regenerator whereby it acquires additional heat and controlling the exit temperature of the naphtha from the coil in the regenerator by valve means responsive to the amount of hot product which flows in heat exchange with the cold naphtha and thereafter passing the thus preheated naphtha to the reaction zone, the naphtha having thus been preheated in the absence of extraneous heat.

2. The method of claim 1 in which the degree of immersion of the coil containing the naphtha in the bed of catalyst in the regeneration zone is varied responsive to the desired preheat temperature of the said naphtha.

3. In the method of catalytically hydroforming naphtha in a system comprising a reaction zone and a regeneration zone, in communication therewith, and wherein the catalyst is in the form of a fluidized bed in each of said zones, and wherein recycled hydrogen-containing gas for the process is heated by means of extraneous heat and fed to the reaction zone, the improvement resulting in adding a substantial quantity of the heat required in the reaction zone which comprises subjecting the cold naphtha to indirect heat exchange with at least a portion of the hot hydroformed product, then passing the naphtha in indirect heat exchange relationship with the catalyst undergoing regeneration by passage through a coil arranged in the bed of catalyst in the regenerator whereby it acquires additional heat and controlling the outlet temperature of the naphtha from the coil in the regenerator by causing at least a portion of the hot product which flows in heat exchange relationship with the cold naphtha to be controlled as to amount so flowing by valve means responsive to said outlet temperature of the naphtha from the coil in the regenerator and thereafter passing the preheated naphtha to the reaction zone, the naphtha having been heated in the absence of extraneous heat, and positioning the regenerator in close proximity to the reactor whereby heated naphthenes are immediately delivered to the reactor thus preventing cracking of the naphthenes.

References Cited in the file of this patent

UNITED STATES PATENTS

| | | |
|---|---|---|
| 2,409,690 | Nicholson et al. | Oct. 22, 1946 |
| 2,436,464 | Van Dornick | Feb. 24, 1948 |
| 2,438,728 | Tyson | Mar. 30, 1948 |
| 2,445,351 | Gohr | July 20, 1948 |
| 2,656,304 | McPherson et al. | Oct. 20, 1953 |
| 2,756,216 | Yoder | July 24, 1956 |
| 2,777,804 | Nicolai | Jan. 15, 1957 |
| 2,789,082 | Barr et al. | Apr. 16, 1957 |